United States Patent [19]

Pritty et al.

[11] Patent Number: 5,434,861
[45] Date of Patent: Jul. 18, 1995

[54] DETERMINISTIC TIMED BUS ACCESS METHOD

[76] Inventors: David Pritty, 66 Colpuhoun Street, Helensburgh, Scotland, G84 9TP; Derek Masson, 18 Campsie Drive, Bearsden Glasgow, Scotland, G61 3HY

[21] Appl. No.: 192,206

[22] Filed: Feb. 4, 1994

Related U.S. Application Data

[63] Continuation of Ser. No. 730,905, Sep. 27, 1991, abandoned.

[30] Foreign Application Priority Data

Feb. 2, 1989 [GB] United Kingdom ............... 8902276

[51] Int. Cl.$^6$ .................................. H04L 12/403
[52] U.S. Cl. ....................... 370/85.8; 340/825.08
[58] Field of Search ..................... 370/85.1-85.3, 370/85.6, 85.8, 94.1, 95.3, 95.2, 13, 100.1; 340/825.07, 825.08, 825.5

[56] References Cited

U.S. PATENT DOCUMENTS

| | | | |
|---|---|---|---|
| 4,412,326 | 10/1983 | Limb | 370/85.3 |
| 4,439,856 | 3/1984 | Ulug | 370/85.3 |
| 4,464,749 | 8/1984 | Ulug | 370/85.1 |
| 4,472,802 | 9/1984 | Pin et al. | 370/95.3 |
| 4,498,168 | 2/1985 | Tseng | 370/85.3 |
| 4,682,324 | 7/1987 | Ulug | 370/85.6 |
| 4,701,911 | 10/1987 | Ulug | 370/85.1 |
| 4,709,364 | 11/1987 | Hasegawa et al. | 370/85.6 |
| 4,719,620 | 1/1988 | Machino et al. | 370/85.6 |
| 4,860,006 | 8/1989 | Barall | 370/85.2 |
| 5,048,009 | 9/1991 | Conrad | 370/13 |

OTHER PUBLICATIONS

William Stallings Data and Computer Communications, '88, pp. 349-351.

*Primary Examiner*—Douglas W. Olms
*Assistant Examiner*—Chau T. Nguyen
*Attorney, Agent, or Firm*—Pennie & Edmonds

[57] ABSTRACT

An improved timed deterministic bus access method and system for a bidirectional linear bus, a unidirectional linear bus, a star and a tree type of bus structure. The method employs a master timing reference signal and discrete values of time delay at each node together with a cycle start signal to provide orderly deterministic access by a number of nodes to a shared bus structure. The master timing reference signal is generated by a polling node which can also transmit messages. The time delays in the nodes can correspond to their physical order from the polling node when this is located at one end. Alternatively values of timing delays can be chosen to make the physical location of the polling node of the other nodes unimportant. The method provides for prioritised access to the bus structure using a reservation hold.

8 Claims, 16 Drawing Sheets

FIG. 14 Cycle Timings

DETERMINISTIC TIMED BUS ACCESS METHOD

CROSS REFERENCE TO RELATED APPLICATION

This application is a continuation of copending, commonly-assigned U.S. patent application Ser. No. 730,905, file Sep. 27, 1991, now abandoned.

BACKGROUND OF THE INVENTION

The present invention relates to an improved deterministic bus access method which is appropriate where a number of stations (or nodes) on a bus which wish to communicate, are located at a distance for example more than 5 meters apart from each other. In particular, but not exclusively, the invention relates to the field of Local Area Networks (LANs).

Any system which allows one or more transmitting stations to communicate with one or more receiving stations over a shared serial or parallel bus using some form of (statistical) time division multiplexing (TDM), requires an access mechanism (or protocol) to determine which one of several active transmitting stations is to be allowed access to the shared bus. In systems where the stations are located close to each other (e.g. less than 5 meters apart) some centralised arbitration system can De used e.g. a central controller. However, in more physically distributed systems the electrical signal propagation delay can limit the effectiveness (speed) of the access mechanism.

Where the access mechanism has to be supported by a bus, constraints imposed on the speed of the access mechanism by the basic nature of a bus can be particularly severe (especially with short packet transmission times and physically long buses). These constraints are firstly that any signal transmitted on a bus is broadcast so that it is received by all stations connected to it and secondly, that the maximum time between a station sending a signal and another station receiving the signal is the end-to-end propagation time of the bus.

The performance of one widely used method of bus access, Collision Sense Multiple Access/Collision Detect (CSMA/CD) is limited mainly by the second consideration; because here the lower limit of the contention slot time which defines the basis of the CSMA/CD back-off algorithims, is fixed by the fact that twice the end-to-end propagation time of the bus has to elapse after start of transmission before a station can be sure that it is the only station transmitting over the bus.

The performance of another widely used method of access, token passing, is limited chiefly by the first consideration because here the token has to be directed to one node at a time by the addition of adequate address information (to the token). The time to transmit the token from one node to the next mode (in the logical ring) plus some allowance for internal node processing and node to node propagation times generally yields fairly lengthy node to node polling times (e.g. of approximately 50 uS in the case of a typical 5 Mbps carrier band implementation of the IEEE 802.4 token passing bus).

The time for the token to circulate completely round the logical ring of such a network is therefore the node to node polling time multiplied by the number of network nodes: for a typical 30 node network this results in a token circulation time of about 1.5 ms (30×50 uS). This circulation time results in excessively long waiting time delays for short packets of data.

Less widely used determinsitic methods of bus access are bit map protocols such as (Multi Level Multi Access (MLMA). In each of these cases the total time taken by the determinsitic methods is based on the fact that the duration of each bit of information in the access method must equal or exceed the end-to-end propagation time of the bus. (e.g. 5 uS for a 1 Km bus) so that all stations are aware of when each particular bit in the access protocol has been set.

It will be appreciated that the efficiency of an access protocol is limited by the ratio of packet transmission time to access time. This is of particular importance as increased data rates result in decreased transmission times for the same length of packet.

SUMMARY OF THE INVENTION

The object of this invention is to obviate or mitigate disadvantages associated with the basic broadcast nature of a bus as evidenced by the problems with the above existing methods. This is achieved by transmitting an access signal onto the bus and by locating a master polling node capable of generating a master timing reference signal or slot pulse at a suitable point on the bus, for instance at one end. The function of issuing the master timing signal can be carried out by a dedicated node with no other purpose or by a node which can also transmit messages. In each case the node carrying out these functions is henceforth referred to as the polling node.

According to one aspect of the present invention there is provided a method of providing timed deterministic access to a bus structure having a plurality of nodes coupled thereto, said method comprising the steps of, a) disposing at least one polling node which acts as a master polling node at a suitable point on the bus structure;

b) generating a timing reference signal which is independent of the data transmission activity from said master polling node to invite all network activity on the bus structure after a period of silence, the period of silence varying in accordance with the previous activity on the: bus structure;

c) providing each node coupled to the bus structure with a predetermined time delay calculated independently of the: data address of the node, and fixed prior to the start of normal operation of the network which determines the order of transmission if the node is active;

d) detecting the generated timing reference signal at each node as the signal travels along the bus structure, said timing reference signal being used by each of the nodes to control its transmission activity onto the bus structure, and e) generating a transmission on the bus structure from an active node which has the smallest value of the sum of the predermined time delay and the time at which the timing reference signal reaches the node if the bus is silent at that time.

It will be appreciated that the value of the time delays at each node are chosen so that transmission from a number of active nodes follows a set sequence.

Preferably, the polling node is disposed at the end of the bus. This arrangement provides the highest access performance.

Preferably, when the polling node is at the end of the bus the time delay corresponds to the order of the physical location of each node on the bus structure from the master polling node. Alternatively, the time delay can be fixed at each node by modifying the time duration of the reference signal as it passes through each node.

Preferably when each node receives a reference signal it
 a) sets a first flag if it has no message to transmit, or
 b) sets a second flag if it has a message to transmit and the state of the bus (i.e. the transmissions from other nodes) allows it to transmit information onto the bus structure after its predetermined delay.

Preferably also, each node remains silent after it sets its first flag until it receives the next reference signal from the master polling node.

Preferably also each node remains silent on receipt of subsequent timing reference signals from the master polling node after it has transmitted its message and set its second flag.

Conveniently, the method includes the step of detecting, at the master polling node, when transmission of a packet is complete before the next reference signal is issued.

Preferably also, the master polling node detects when all nodes have set their second flags and are remaining silent and after a predetermined period issues a cycle start reference signal to reset the second flags of each node to permit all nodes to be able to start transmission on receipt of a subsequent timing reference signal.

Alternatively the operation of the nodes can be arranged such that second timing reference signal issued after a predetermined period of silence can reset the second flags of each node to permit all nodes to start transmission.

Conveniently where polling is at one end of the bus the timer delay of each node is determined by the time between the start of the reference signal and the start of the packet transmission which is n.td where n is an integer representative of the node position from the master polling node and td is a small time delay.

Alternatively when the system is configured so that the location of the polling node and of the other nodes is unimportant then nodes are assigned time delays 2n.tp+td where n is an integral representation of the number of the node, tp is the maximum end-to-end propagation delay on the bus structure and td is a small time delay.

Alternatively when the bus structure is a uni-directional bus structure the time delay can be varied for each node by varying the time duration of the reference signal received at the node wishing to transmit.

Preferably when the polling node is located at an end of the bus structure the method includes associating each reference signal with a priority reservation field generated between the reference signal and the start of the packet being transmitted from a node, the priority reservation field being compared by each node with its own priority and a node being able to transmit onto the bus structure if its priority is greater or equal to a predetermined priority value, and the bus structure is silent.

Conveniently, when the master polling node is located at one end of the bus the master polling node generates a priority request signal followed by a priority invitation period to allow the nodes to set their priority fields, and these fields being circulated back to the master polling node which issues a further reference signal which allows the first upstream node having a priority greater than or equal to the priority and reservation field to transmit a packet during the current interval if the bus is silent.

Preferably, also the time delays of each node can be set manually or automatically.

Conveniently in automatic setting the master polling node sends a reference signal pattern to each node in turn, said reference signal pattern containing node address information for the particular node, and after a preset time the recipient node replies to the master polling node, whereupon the master polling node stores a value representative of the distance of the recipient node from the master polling node in its memory and allocates a unique value of time delay to each node using the network's communication facilities.

It will be appreciated that it may be convenient to implement these communication facilities (which establish the values to which the timer delays should be set) using other access protocols (such as CSMA/CD).

Conveniently also, the master polling node automatically reconfigures the priority of nodes coupled to the bus structure in response to the node request using the network's communication facilities.

Conveniently the method includes the step of equipping a number of nodes with polling facilities whereby on failure of upstream nodes the most operational upstream node automatically assumes the polling function. Alternatively in the arrangement where the system operates independent of the physical location of the polling node any other active node can assume the polling function.

Preferably when the bus structure is a uni-directional bus each node coupled to the bus structure is capable of issuing a reference signal after it has transmitted the end of its packet, wherein the master polling node passes the received signal back to its upstream output to allow several packets to co-exist on the uni-directional bus (assuming the electrical length of the bus is longer than the transmission time of a packet).

According to another aspect of the present invention there is provided a system for providing timed deterministic access to a bus structure having a plurality of nodes coupled thereto, said system comprising, a) at least one master polling means coupled to the bus structure at a suitable location for generating a timing reference signal which is independent of the data transmission activity on said bus structure to initiate all network activity on the bus structure after a period of silence, the period of silence varying in accordance with previous network activity on the bus structure;

b) timing reference signal detecting means coupled to each node for detecting said reference signal as it passes said node, each node coupled to the bus structure having means of storing a predetermined time delay calculated independently of the data address and fixed prior to the start of normal operation of the network, said timing reference signal being used by each of the nodes to control its transmission activity onto the bus structure, and c) bus activity monitoring means associated with each a system node for monitoring the activity of the bus structure, the arrangement being such that a transmission is generated on the bus structure from an active node whose time delay grants it the opportunity to transmit first a packet onto said bus structure a predetermined time after the reference signal has been received by said timing reference signal detecting means if the bus is silent at that time.

Preferably, the master polling means is located at one end of the bus and the active node closest to the polling node transmits first.

Alternatively the polling node may be located anywhere on the bus structure and the increments between the time delays assigned to each node in this arrangement are conveniently made longer than twice the maximum propagation delay between the most remote ends on the bus structure.

Preferably also said time delay means is variable for each node to vary the time delay after which the node can transmit a packet.

Alternatively said time delay means is fixed at each node, the time delay after which the node issues a packet being modified by lengthening the timing reference signal as it passes through each node.

Conveniently the time delays of each node are manually or automatically resettable to a different value.

Advantageously the system nodes are automatically reconfigurable to modify the value of the priority of nodes in response to node requests.

Conveniently the bus structure is selected from the group consisting of a bidirectional linear bus, a uni-directional linear bus, a star (hub) and a tree.

Preferably also the system includes means for generating a priority reservation field coupled to the master polling unit, and priority comparison means coupled to each node for comparing the priority of the reservation field with the priority of the node.

Conveniently, the system may provide timed deterministic access to a uni-directional bus, said uni-directional bus having a plurality of nodes coupled thereto, and a master polling means disposed at one end of the bus for generating a timed reference signal on said bus structure said system comprising, a) at least one master polling means coupled to an end of the bus structure for generating a timing reference signal on said bus structure;

b) timing reference signal detecting means coupled to each node for detecting said reference signal as it passes said node, each node connected to the bus structure having predetermined timing delay means calculated prior to the start of operation, and c) bus activity monitoring means associated with each node for monitoring the activity of the bus structure, and each node having timing reference signal generating means associated therewith for issuing a reference signal after the node has transmitted its packet, the master polling node being arranged to pass issued reference pulses to its upstream output and allowing several packets to co-exist on the uni-directional bus and for high speed buses.

BRIEF DESCRIPTION OF THE DRAWINGS

These and other aspects of the invention will become apparent from the following description when taken in combination with the accompanying drawings in which.

DETAILED DESCRIPTION

Figure 1:
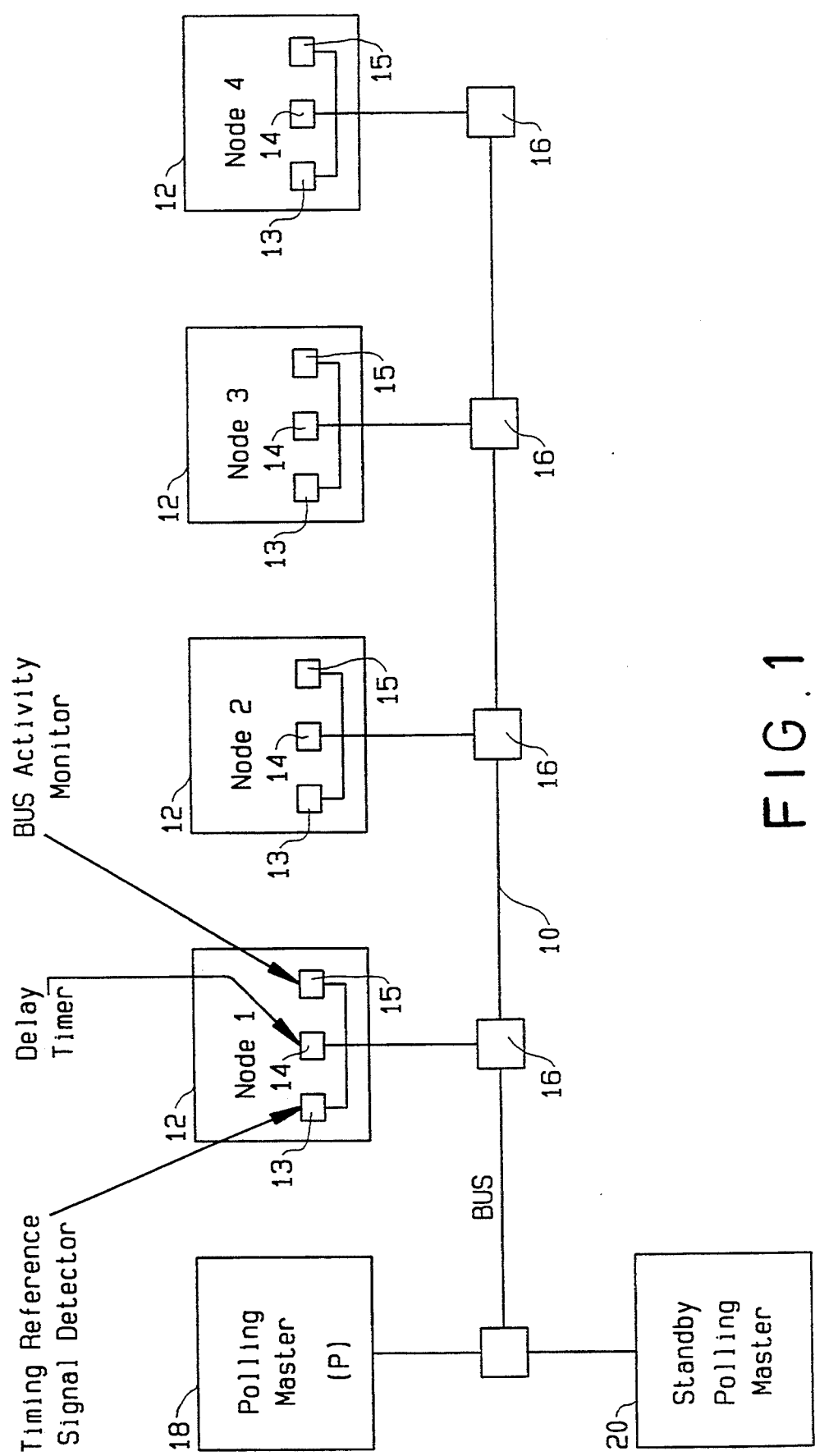
FIG. 1 is a schematic block diagram of a bi-directional linear bus having a polling system in accordance with an embodiment of the invention to provide deterministic access to the bus.

Reference is first made to FIG. 1 of the drawings which depicts a bi-directional linear bus 10 coupled to nodes 12 via connectors 16 on the bus 10. It will be appreciated that a plurality of nodes are coupled to the bus but only four nodes 1 to 4 are shown in the interest of clarity. Each of the four nodes 1 to 4 contains a timing reference signal detector 13, a delay timer 14 for storing a time delay value unique to that node and a bus activity monitor 15 and the operation of these elements will be later described. A monitor or master polling node 18 is located at one end of the linear bus 10. It will be appreciated that this master node 18 can also transmit data as well as controlling access to the bus 10 although only this function is described. One or more standby polling master nodes 20 are also located at the end of the bus 10 so that if master polling nodes 18 fails the standby node 20 can replace polling functions, as is well known in the art. It will be appreciated that these standby nodes may also be capable of data transmission. It will further be appreciated that where the increment of time delays between nodes has been chosen to exceed twice the maximum end to end propagation delay on the bus the physical location of the standby nodes is unimportant and thus any node can assume the polling function. Each node 12 is coupled to a connector 16 via a bus transceiver (not shown in the interest of clarity).

It will be appreciated that the system is arranged so that for polling functions uni-directional operation is achieved on a bi-directional linear bus by locating the polling node 18 at one end of the bus. Thus when a polling node located at an end issues a signal such as a pulse it propagates uni-directionally along the bus. Termination matched to the characteristic impedance of the bus will ensure a limited amplitude of reflection of signals from the remote end.

Figure 2:
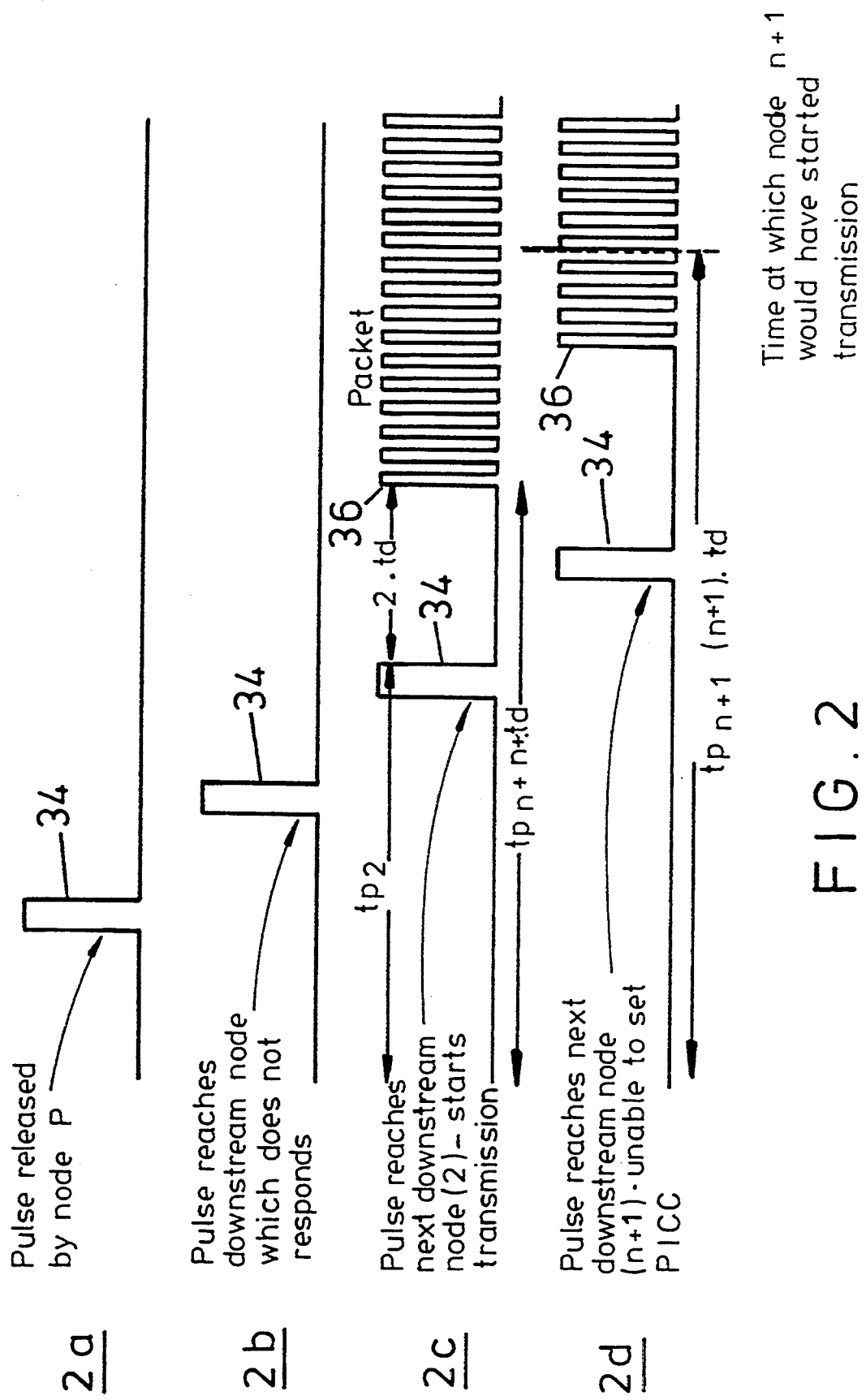
FIG. 2(a-d) are waveform timing diagrams depicting propagation of a timing reference signal or slot pulse and a packet preamble (or other packet start method) along the bus shown in FIG. 1.

Operation of the system for a medium speed data rate i.e. (1 to 10 Mbps) will now be described with reference to FIGS. 2a-2d and FIG. 3 as well as FIG. 1 but with 30 nodes coupled to the bus although it will be understood that higher and lower data rates can be used. All nodes 12, coupled to the bus listen to the bus 10. The master polling node 18 monitors the bus and, when the bus is silent for a sufficient period, issues a timing reference signal or "slot" pulse 34 which is conveniently represented as a pulse of rectangular shape as seen in FIG. 2a. This signal (pulse) 34 propagates uni-directionally and is received by each node 12 after its release at a time corresponding to the product of the physical distance of the particular node from the master polling station 18 and the propagation rate of the medium. The timing reference signal detector 13 of each node detects the slot pulse 34 as it passes the node. The delay timer 14 of each of nodes 1 to 4 is set to a value n.td where n is the number of the node according to its physical position from node 18, and td a small delay, for example 0.5 uS per node. When a node having a message to transmit receives the timing reference signal or slot pulse 34 for example, node number 2 in FIG. 1 begins transmission of the packet 36 at a time $tp_2$ which is the propagation time of the slot pulse from node 18 as best seen in FIG. 2c. In this case $tp_n + ntd = tp_2 + 2.td$.

The inclusion of a time delay in delay timer 14 corresponding to the order of physical location of each node on the bus 10 from node 18 ensures that only one active node, namely that located closest to master polling node 18, can start transmission in any one slot pulse cycle. This is achieved by a mechanism shown in FIG. 2d. Suppose node n and node n+1 (eg node 2 and node 3) wish to transmit in a given slot pulse cycle, where a slot pulse cycle is the time between the issue of one slot pulse by the polling node and the next. Because node 2 is the upstream node (i.e. that nearer the polling node 18), using its bus activity monitoring means 15 it inspects the state of the bus at a time $tp_2 + 2.td$ by the bus activity monitor 15 and finds that the bus is silent and starts to transmit. Thus, it will be understood that only one active element can transmit in any one slot pulse cycle due to the inclusion of the node having a time delay value in the delay timer 14 corresponding to the physical location of each node from the bus 10, this represents a unique predetermined time delay value held by the delay timer at each node.

At time $tp_3$ node 3 receives the slot pulse, the bus activity monitor 15 using its bus activity monitoring means 15 it examines the bus at a time 3.td after the slot pulse arrives at the node and finds it busy because of the packet being transmitted from node 2. It therefore waits until the next slot pulse is received before it can attempt to transmit.

When a node receives a slot pulse 34 the node:
1. Sets a "next slot" flag if it has no message to transmit, as in the case shown in FIG. 2b for node 1; or
2. Sets a "transmit" flag and starts to transmit a packet as described above as shown in FIG. 2c for node 2. A "next Slot" flag and a "transmit" flag are internal bits in each node which are set to a particular predetermined state to control the operation of the node as described below.

Once a node has set its "next slot" flag it remains silent until it receives the next "slot" pulse 34 from polling node 18. Thus nodes which are physically close to node 18 and which discover later in the slot pulse cycle that they have traffic are prevented from transmitting once the current slot pulse of the current cycle has propagated past them. Following from the description above, it will be understood that once transmission from a particular node has started the transmission signal propagates to downstream nodes (those further from node 18), before these nodes are allowed (by their delay timers) to start their own transmissions. These nodes thus recognize the busy nature of the current slot cycle and also set their "next slot" flags.

The above describes the basic (timed) deterministic access method for one slot pulse cycle which gives one active node access to the bi-directional linear bus. After transmission of a packet, node 18 detects that the bus 10 has gone silent and issues another slot pulse. Alternatively the downstream end of bus 10 can be connected back into the receiving circuits of master node 18.

Eventually all active nodes will have a chance to transmit and will set their "transmit" flags. After that the polling node will fail to detect the start of a packet. In this case the polling master node 18 knows that within twice the end-to-end propagation delay of the bus plus M.td that no nodes wish to transmit (where M is the number of nodes connected to the bus excluding the polling nodes).

Figure 3:
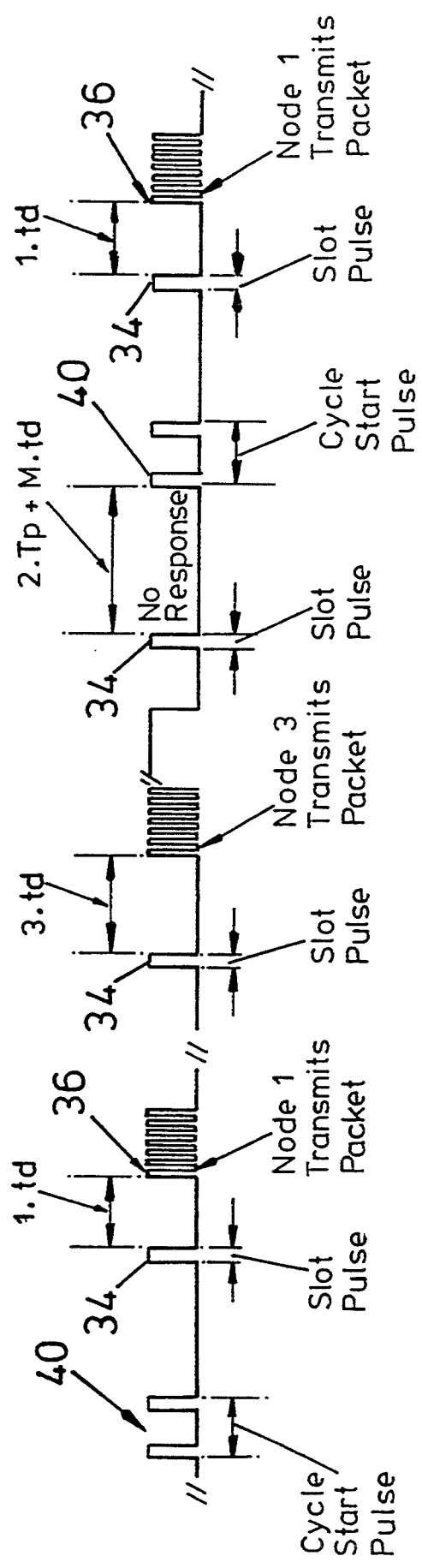
FIG. 3 depicts cycle timing waveforms for use with the bus shown in FIG. 1 using this method of access.

When the polling master node 18 detects a silence extending beyond this period the node 18 realises that all active stations have been allowed access to the bus at least once. The polling node then transmits a pulse pattern called the "cycle start" pulse 40 as seen in FIG. 3.

The cycle start pulse 40 ensures an orderly polling cycle for all the nodes. It causes all nodes 12 to reset their "transmit" flags and allows all nodes to start transmission on receipt of a slot pulse 34, subject to the above mentioned rules. The "cycle start" pulse 40 is followed by a series of slot pulses and this is repeated throughout the operation of the bus access method. It will be appreciated that the operation of the nodes can be modified such that a second slot pulse after a predetermined period of silence can perform the same function as the cycle start pulse. Such an arrangement has the advantage that a second signal pattern does not require to be generated or detected.

The above describes the operation of the invention with a bidirectional linear bus. It will be appreciated that operation is possible with other bus structures namely tree, hub (or star) and a uni-directional bus and each of these situations is described below it will be understood that each node on the other bus structure described below includes a timing reference signal detector 13, a delay timer 14 and a bus activity monitor 15 which operate as described above although, in the interests of avoiding redundancy, further description of these elements is not repeated in any of these embodiments.

Figure 4:
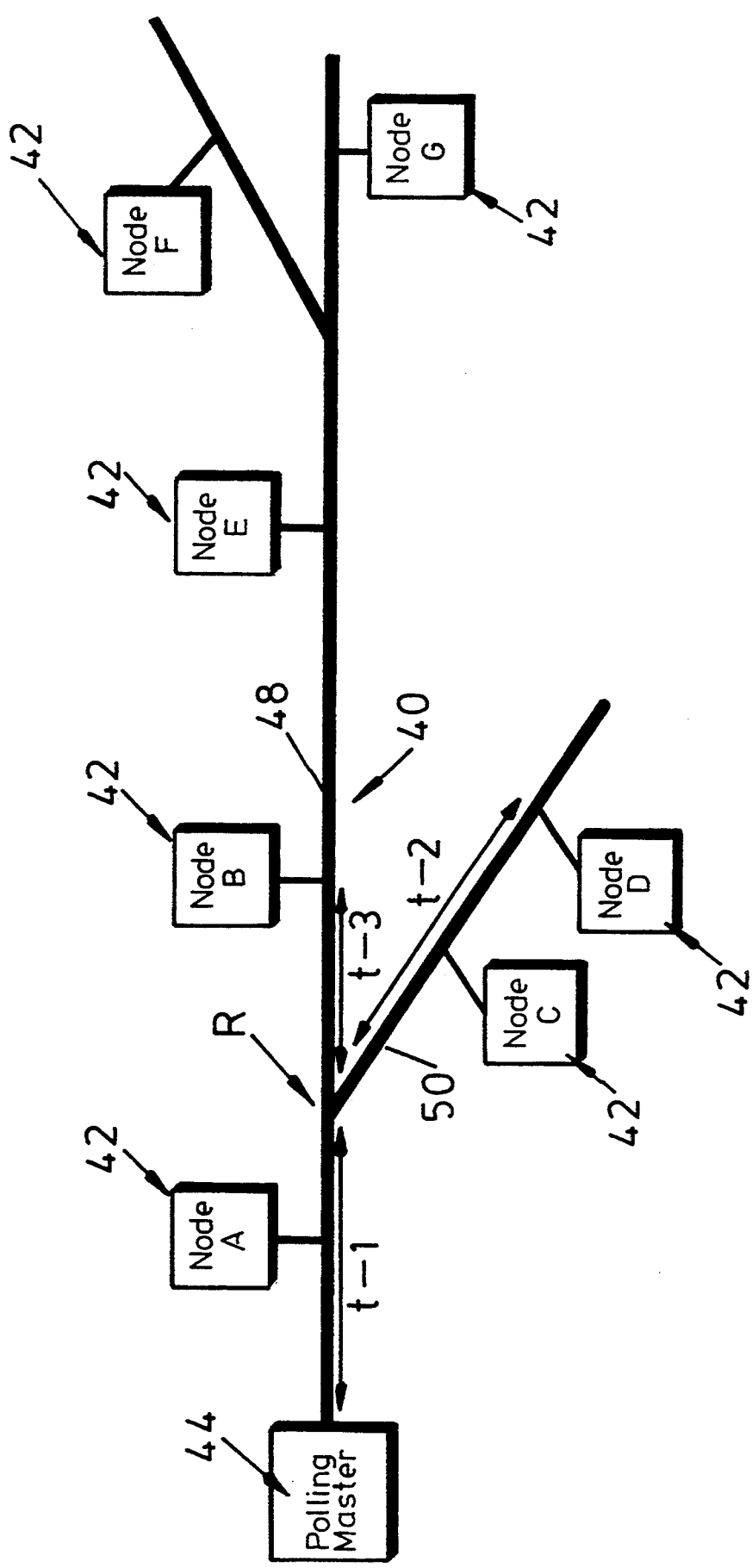
FIG. 4 is a schematic block diagram of a tree topology used with a polling system in accordance with a second embodiment of the invention to provide timed determinsitic access to the bus.

Reference is first made to FIG. 4 of the drawings which depicts a tree 40 coupled to nodes 42. It will be appreciated that a plurality of nodes are coupled to the bus but only seven A to G are shown in the interest of clarity. A monitor or polling master node 44 is located at the "root" of the tree. The master node 44 can also transmit data as well as controlling access to the tree 40. Standby polling nodes can also be provisioned but are not shown in the interests of clarity.

Figure 5:
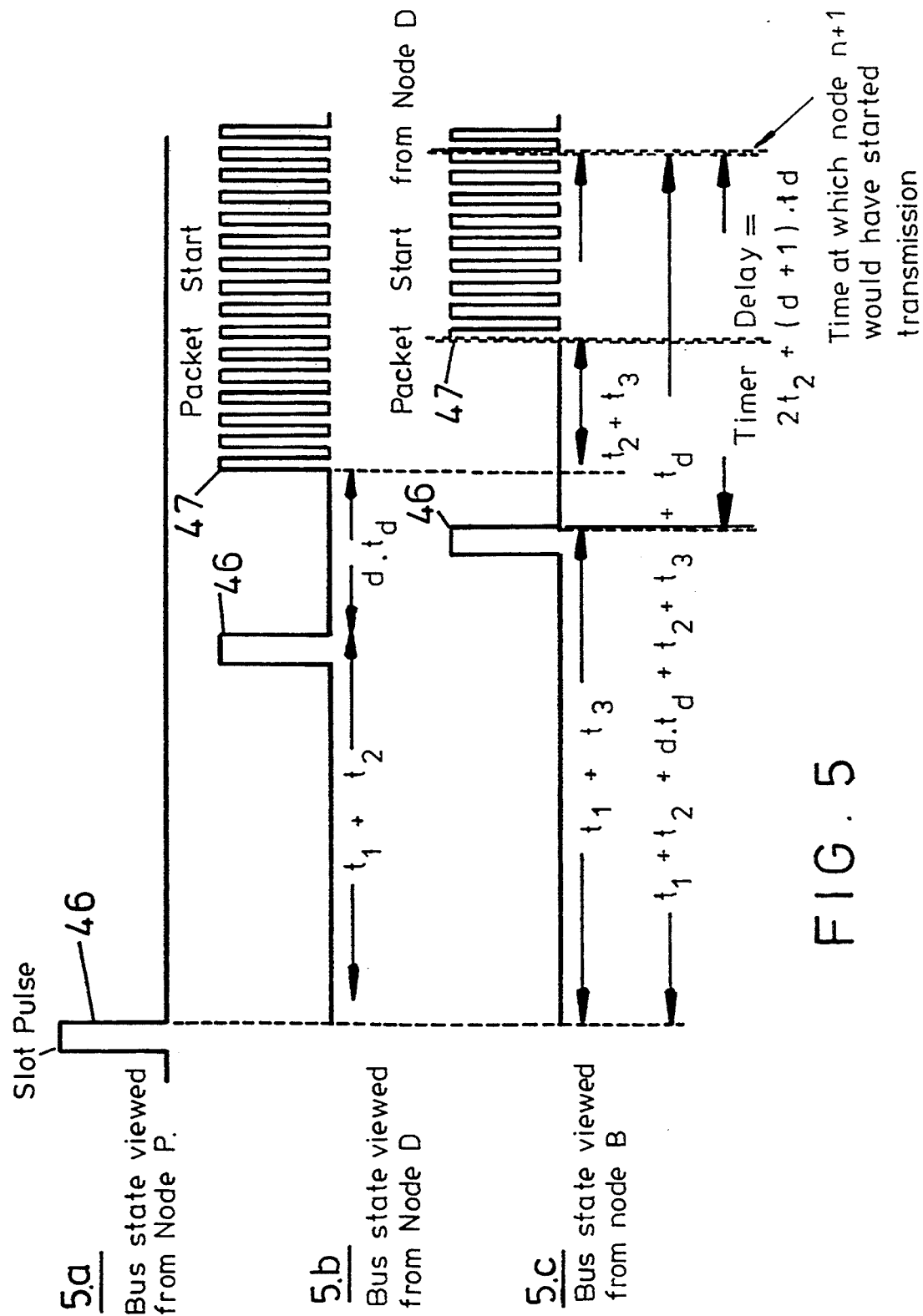
FIGS. 5a to c are waveforms timing diagrams depicting propagation of a timing reference signal or slot pulse and a packet preamble along the tree shown in FIG. 4.

Operation of the system will now be described with reference also to FIGS. 5a–5c. All nodes 42 coupled to the tree (bus) listen to the bus 40. The master polling node 44 monitors the bus and issues a "slot" pulse 46 conveniently of rectangular shape as shown in FIG. 5a when the bus is silent. This pulse 46 propagates along the tree 40 and is received by each node 42 at a time corresponding to the physical distance from the master polling node 44. It will be appreciated that at point R on the tree the slot pulse 46 will propagate simultaneously down the trunk 48 and down branch 50 of the tree to nodes C and D. $L_1$ is the distance of point R from the master polling node, $L_2$ is the distance from point R to node D and $L_3$ is the distance from point R to node B. The propagation times corresponding to lengths $L_1$, $L_2$ and $L_3$ are $t_1$, $t_2$ and $t_3$ respectively. The slot pulses reach node D at a time $t_1+t_2$ and node B in a time $t_1+t_3$ as seen in FIGS. 5b and 5c.

Operation is described for the case where the polling algorithm is chosen to allow access to the bus by nodes C and D before node B. The values of timer delay for nodes C and D are thus chosen according to their physical position from the Polling Master. Suppose that for node D the delay is $d.t_d$. The packet from D will then reach B at time $t_1+2t_2+t_3+d.t_d$.

A suitable value for the time delay for node B is $t_1+2t_2+t_3+(d+1).t_d-(t_1+t_3)=2t_2+(d+1).t_d$ and this is diagrammatically seen in FIG. 5c which is the time at which node n+1 (node B) would have started transmission.

Other nodes more distant from the polling node are allocated higher values of timing delay. The values of timer delays for other branches can be calculated using the above method and example. It will be understood that a cycle start pulse is also used to ensure an orderly polling cycle for all the nodes in the same way as achieved with the bidirectional bus and the cycle start pulse can be a pair of pulses as seen in FIG. 3 or other suitable signal pattern of pulses. Alternatively a second slot pulse after a predetermined period of silence can be used as heretofore described.

Figure 6:
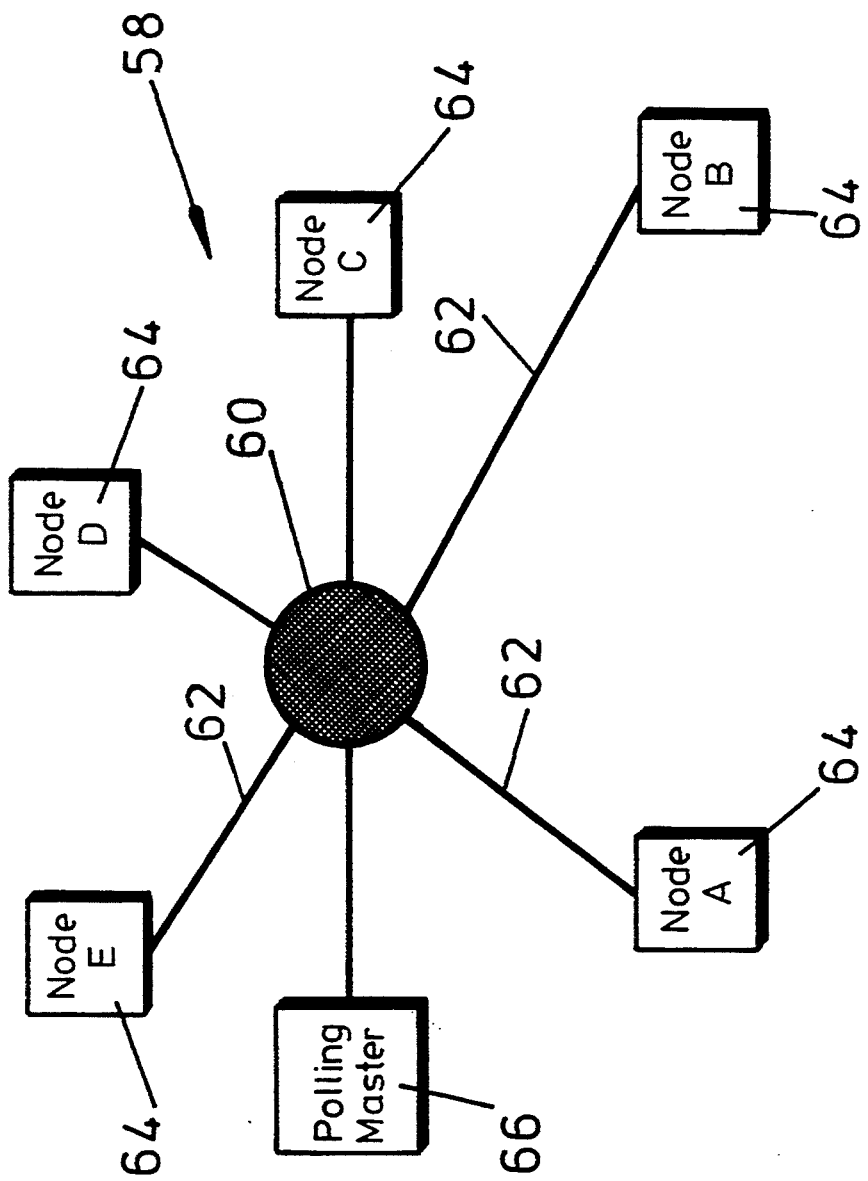
FIG. 6 is a schematic block diagram of a Hub (or star) bus configuration having a polling system to provide deterministic access to the Hub bus in accordance with another aspect of the invention.

Reference is now made to FIG. 6 of the drawings which is a schematic block diagram of a Hub (or star) bus configuration 58 having a polling system in accordance with further embodiment of the invention to provide deterministic access to the Hub bus.

Reference is now made to FIG. 6 of the drawings which depicts a hub 60 coupled by star links 62 to five nodes 64 A to E. A monitor or polling master node 66 is connected to the hub 60. It will be appreciated that this master node 66 can also transmit data as well as controlling access to the bus configuration although only this (polling) function is described. The master polling node 66 monitors the bus and issues a slot pulse of rectangular shape as described above when the bus is silent. This pulse simultaneously propagates along the star links to the nodes 64 A to E which are at a distance $L_1$, $L_2$, $L_3$, $L_4$ and $L_5$ respectively from the Hub 60. The signal propagation times corresponding to $L_A$ to $L_E$ are $t_A$ to $t_E$ respectively. Each node will receive the slot pulse at times $t_h+t_a$, $t_h+t_B$, $t_h1+t_D$ etc. where $t_h$ is propagation time between the polling master 66 and the hub 60.

The operation of the timed access method is as follows:

The time for the slot pulse to reach Node A is $t_h+tA$. The earliest time that node A can start transmission is $t_h+t_A+t_d$ where td is the timer delay at each node. Thus the time for a packet transmitted from node A to reach node B is then $t_h+t_A+t_d+t_a+t_B$ Furthermore the time for a slot pulse to reach node B is $t_h+t_B$ To ensure correct operation the B node timer delay must be greater than the difference between the arrival time of the slot pulse and a packet from node A.

ie, the node B timer delay$=(t_h+2t_A+t_B+t_d)-(t_h+t_B)=2t_A+t_d$.

Therefore the value of the timer delay at node B is chosen as $2t_A+2t_d$.

Thus the earliest time node B can start transmission is $t_h+2t_A+t_B+2t_D$. This packet will arrive at node C at a time $t_h+2t_A+2t_B+t_C+2t_d$ The time for the slot pulse to reach node C is $th+tC$ and, as before, the timer delay at node C must be greater than $t_h+2t_A+2t_B+2t_d+t_c-t_h-t_C=2t_A+2t_B+2t_d$. Therefore a value of $2t_A+2t_B+3t_d$ is chosen.

Summarising of the above it will be understood that the:

timer delay at node A$=t_d$
timer delay at node B$=2t_A+2t_d$
timer delay at node C$=2t_A+2t_B+3t_d$.

The above equations indicate how one method of operation of the timed access method with a hub connected bus can be implemented.

The operation of the timed access method applied to a uni-directional bus will now be described below.

Figure 7:
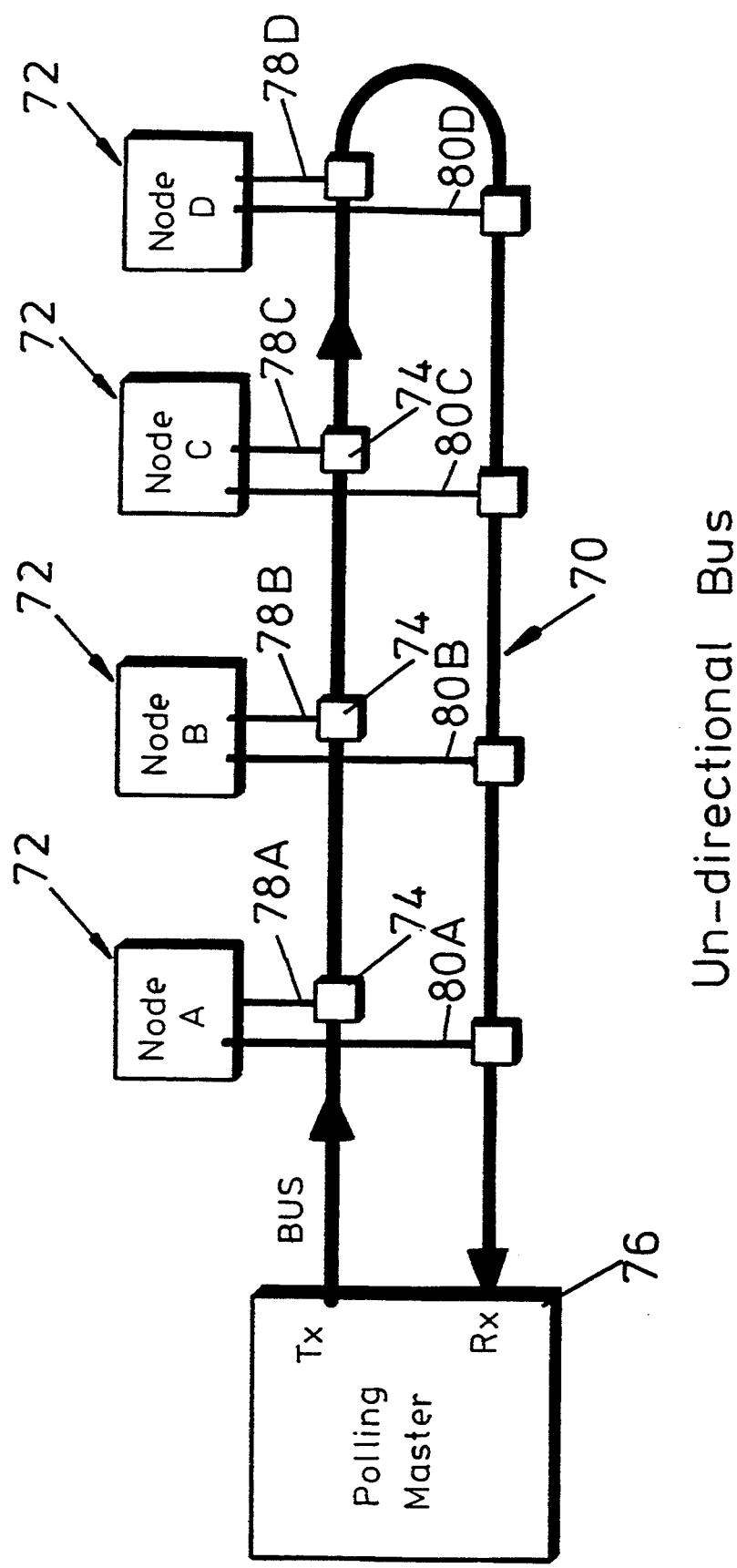
FIG. 7 is a schematic block diagram of a uni-directional bus with a polling system to provide deterministic access in accordance with another embodiment of the invention.

FIG. 7 is a schematic block diagram of a uni-directional bus 70 to which a series of four nodes 72 is connected via repeaters 74. A polling master node 76 is located with its transmitter at the most upstream end of the bus. A standby node can be provisioned but this is not shown in the interests of clarity. It will be understood that each node connected to the bus 70 can listen to the upstream state of the bus by a link 78A to 78D and transmit onto the bus over the same link or an adjacent link 78A to 78D. Links 80A to 80D allow the respective nodes 72A to 72D to listen to the downstream state of the bus to be able to receive messages transmitted on the upstream part of the bus by links 78 A to D. The arrangement shown in FIG. 7 can be used with different value timer delays for each node as described above to determine the transmission times for each node.

lit will further be appreciated that an alternative arrangement of the uni-directional bus system is to incorporate fixed timer delays within the nodes 72A to 72D. The system uses a slot pulse and cycle start pulse pattern (or two adjacent slot pulses) in the same manner as described above.

Figure 8:
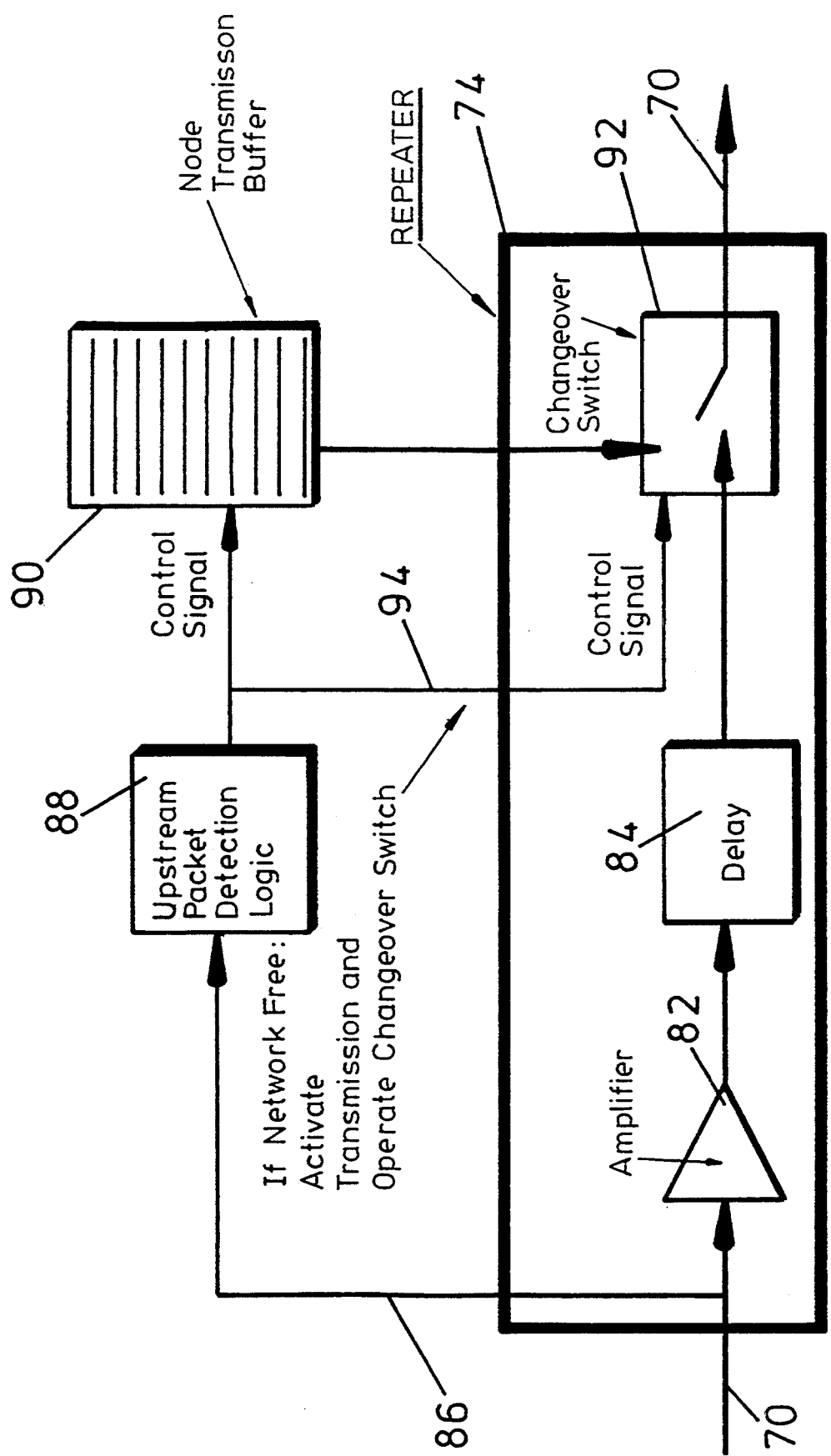
FIG. 8 is a schematic block diagram of part of a node 72 having a fixed timer delay connected to the uni-directional bus system.

Reference is now made to FIG. 8 which is a schematic block diagram of part of a node 72A with a timer delay connected to the bus 70. The fixed delay is the same for all nodes.

The node is coupled to the repeater 74 which includes an amplifier 82 in series with a delay element 84 and the bus 70 is also coupled by link 86 to a slot pulse detection circuit 88 in the node which is connected to a node transmission buffer 90. A changeover switch 92 is connected between bus 70 and the outputs of the delay circuit 84 and the node transmission buffer 90. The changeover switch 92 is also coupled to the logic circuit 88 by a control conductor 94 for controlling switch operation as will be described.

In operation, all signals on the bus 70 pass through the repeater amplifier 82 which includes delay element 84 and change over switch 92. This allows the node's upstream packet detection logic 88 to determine whether a packet is arriving from an upstream node before a decision has to be made on whether to initiate a transmission from the transmission Buffer 90 or whether the network is already transmitting an upstream packet. If the bus is silent and the node wishes to transmit the changeover switch 92 is connected to the transmission buffer 90.

if the network is active (with an upstream packet) a control signal from logic current 88 on conductor 94 causes the changeover switch to connect the output of the delay element 84 to the downstream bus 70. If the medium is silent the control signal causes the output of the delay element 84 to be connected to the downstream bus.

It will be further appreciated that an alternative arrangement of the uni-directional bus system allows the same fixed timer delays to be incorporated at all of the nodes 72a to 72d. The system uses a slot pulse and cycle start pulse (or two adjacent slot pulses) in the same manner as described above.

Figure 9:
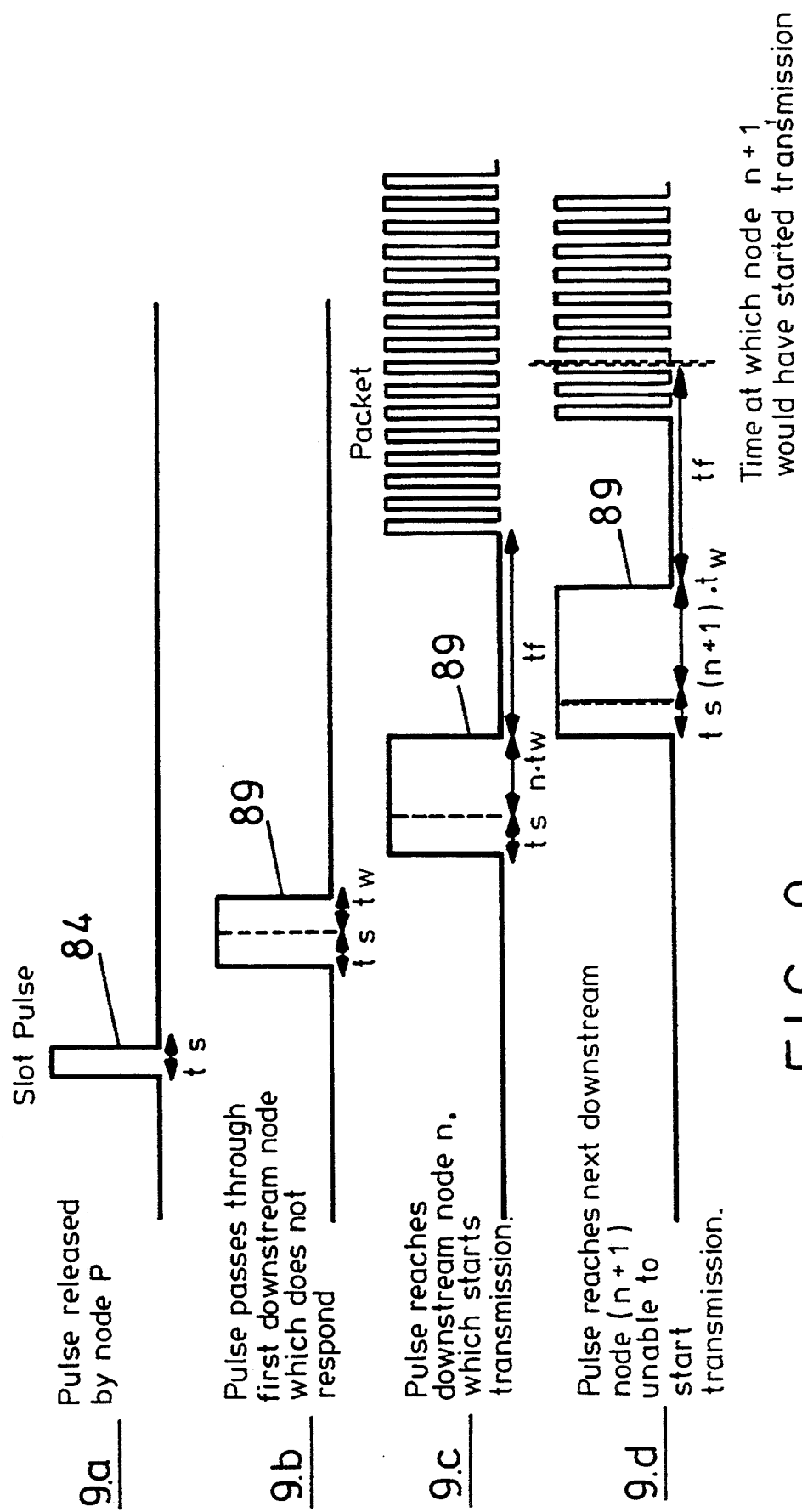
FIGS. 9(a-d) are time waveform diagram depicting propagation of a timing reference signal or slot pulse and packet preamble for use with an alternative method of determining node access to that shown in the arrangement of FIGS. 7 and 8

Reference is now made to FIG. 9 which depicts the operation of an alternative arrangement to that of FIG. 8 to determine node access in the bus structure shown in FIG. 7 where the nodes 72a to 72d each contain a circuit means to extending the length of the slot pulse by a fixed amount, say $t_w$, as it passes through each node in turn. As the slot pulse 87 passes through each node it is lengthened by an amount $t_w$. A node wishing to transmit a packet does so after a fixed time delay $t_f$ reckoned from the back edge 89 of the slot pulse i.e. timing reference signal 187. A downstream node wishing to transmit inspects the upstream state of the bus tf after the extended edge 89 of the slot pulse 87.

When node n and node n+1 (eg node B and node C wish to transmit in a given slot pulse cycle, where a slot pulse cycle is the time between the issue of one slot pulse and the next, then because node 2 is the upstream node it inspects the state of the bus at a time $t_s + 2.t_w + t_f$ after the start of the slot pulse and finds it silent and starts to transmit. Node 3 wishes to transmit and examines the state of the bus $t_s + 3.t_w$ after the start of the slot pulse. It finds the bus busy at that time and sets its "next slot" flag and awaits receipt of the next slot pulse.

Alternatively nodes 72A to 72D can be equipped with a circuit for detecting that the slot pulse length has been increased from $t_s$ to $t_s + t_w$ (not shown for the sake of clarity).

in this arrangement the first upstream node with a packet to transmit determines that the width of the slot pulse is $t_w$ and lengthens it to $t_s + t_w$ and transmits its packet:.

Other downstream nodes detect the widened slot pulse indicating that the net is busy and remain silent for that slot pulse cycle.

The cycle start pulse (or adjacent slot pulses) arrangement is operated in a manner similar to that described above.

Various modifications may be made to the bus structures hereinbefore described without departing from the scope of the invention. The principal modification is locating the polling node at any suitable location on the bus structure.

Figure 10:
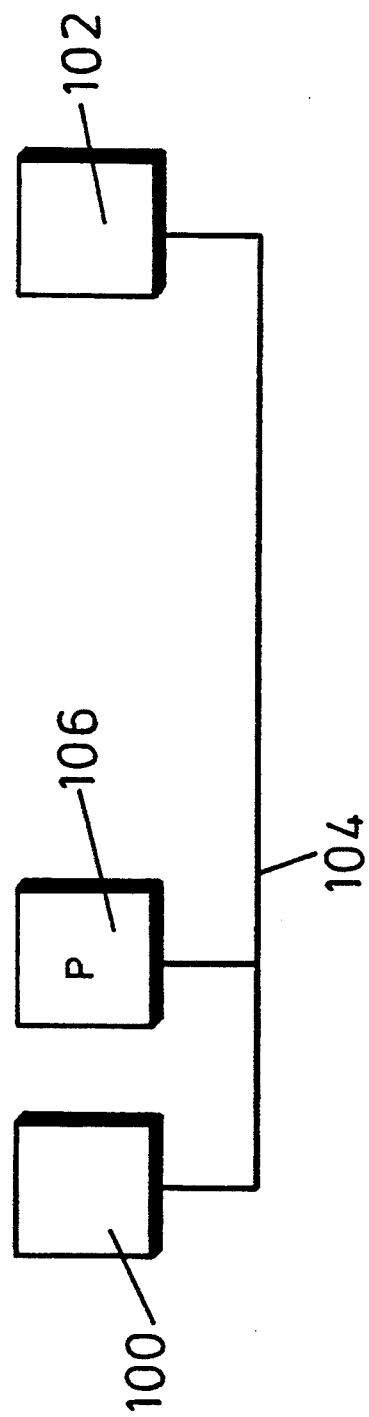
FIG. 10 is a figure similar to FIG. 1 in which the master polling node is located between the ends of the bus.

Reference is made to FIG. 10 which depicts nodes 100 and 102 connected to bus 104. Polling node 106 is also connected to bus 104 very close to node 100. Node 102 is located very close to the remote end of the bus. Since node 100 is very close to the polling node and node 102 is as remote from the polling node as is possible on the bus it would be natural to choose time delays which would allow node 100 to transmit before node 102. If we assign time delays to node 102 that allows it to transmit before node 100 then we have assigned time delays to the nodes which provide an order of transmission of the two nodes which is independent both of the physical position of either node on the bus and of the polling node.

Allocation of the following time delays allows node 102 to transmit before node 100. Assuming the slot pulse is released from the polling node 106 at time t=0 then it is received by node 100 at t=0 (since there is negligible propagation delay between these nodes) and by node 102 at t=tp (the end to end propagation delay of the linear bus). Node 102 transmits its message at time t=tp+td where td is a small time delay. As shown in FIG. 10 this is received by node 100 at time t=2. tp+td. Because the delay at node 100 is 2.tp+2.td node 100 does not transmit.

If node 102 is now moved closer to the polling node it will transmit earlier and thus provide a greater time safety margin in preventing node 100 transmitting. Also if node 100 is moved further from the polling node it will receive the slot pulse later (and given the same time delay) will transmit later (again increasing the safety margin). This logic can be expanded in a bus structure to cover a multiplicity of nodes. Additionally if the location of the polling node n is further from node 100 and closer to node 102 then node 102 will transmit earlier, and node 100 will transmit later. This shows that the physical location of the nodes are unimportant when these time delays are assigned to nodes 100, 102 and the polling node.

Figure 11:
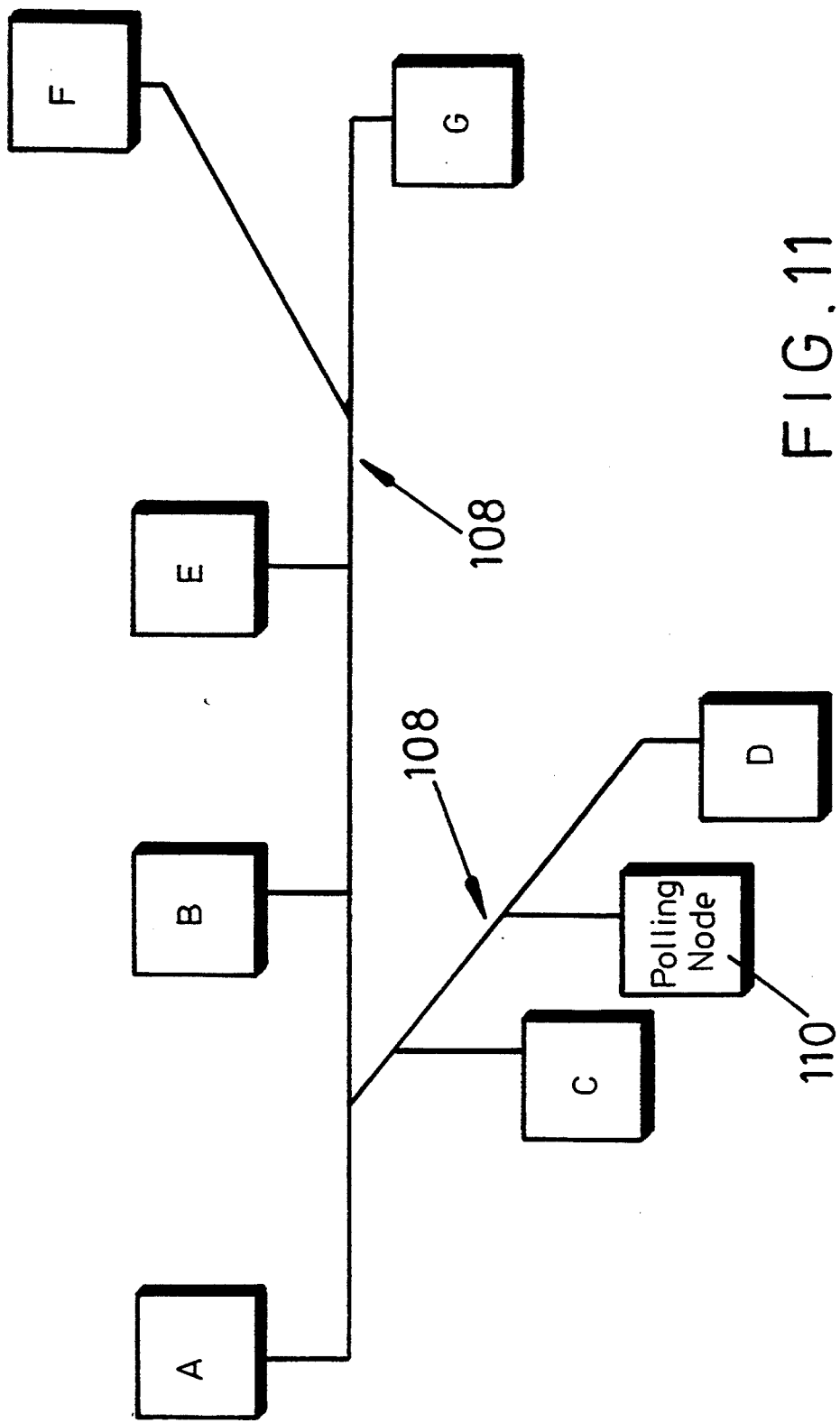
FIG. 11 is a diagram of a tree topology embodiment similar to FIG. 4 with the polling node located in a branch of the tree.

Reference is now made to FIG. 11 of the drawings which depicts a tree topology network with the polling node disposed on the branch of the tree. In this embodiment depicts nodes a to g connected to the tree structure 108. It will be appreciated that the longest end to end propagation time delay on the tree (tp) is from the end of the branch containing nodes c and d to the end of the branch containing node f. Because the branch containing nodes c and d is longer than the branch containing node a and the branch containing node f is longer than the branch containing node g.

Polling master node 110 is connected to the branch containing node d very close to the end of the branch as shown in FIG. 11. Node f is located very close to the end of is branch. It will therefore be appreciated that the propagation delay between polling node p and node d is negligible and the propagation delay between nodes p and node f is tp.

Because node d is very close to the polling node and node f is as remote from the polling node as is possible on the tree it would be natural to choose time delays which would allow node d to transmit before node f. If we assign time delays to node f that allows it to transmit before node d then we have assigned time delays to the nodes which are independent of the physical position of either node on the bus.

Allocation of the following time delays allows node f to transmit before node d.

Assuming the slot pulse is released from the polling node at time t=0 then it is received by node d at t=0 (since there is negligible propagation delay between these nodes) and by node f at t=tp (the maximum end to end propagation delay of the tree structure). Node f transmits its message at time t=tp+td where td is a small time delay. This is received by node d at time t=2.tp+td. Since the delay at node d is 2.tp+2.td node d does not transmit.

If node f is now moved closer to the polling node it will transmit earlier and thus provide a greater safety margin in preventing node d transmitting. Also if node d is moved further from the polling node it will receive the slot pulse later (and given the same node timer delay) will transmit later (again increasing the safety margin).

It will further be appreciated that the master polling node 110 may be located anywhere on the tree structure and the time delays at individual nodes made independent of their physical location on the bus structure.

If we moved polling node 110 it must lie closer to node f and hence the slot pulse will reach node 110 earlier allowing it to transmit earlier and thus increasing the safety margin. Similarly if we move node 110 it must be further from node d increasing the time before the slot pulse reaches node d again increasing the safety margin. It will be appreciated that this logic can be repeated for the other nodes connected to the tree. In this case timer values are incremented (from one node to another) by more than twice the maximum end to end propagation delay on the bus.

Figure 12:
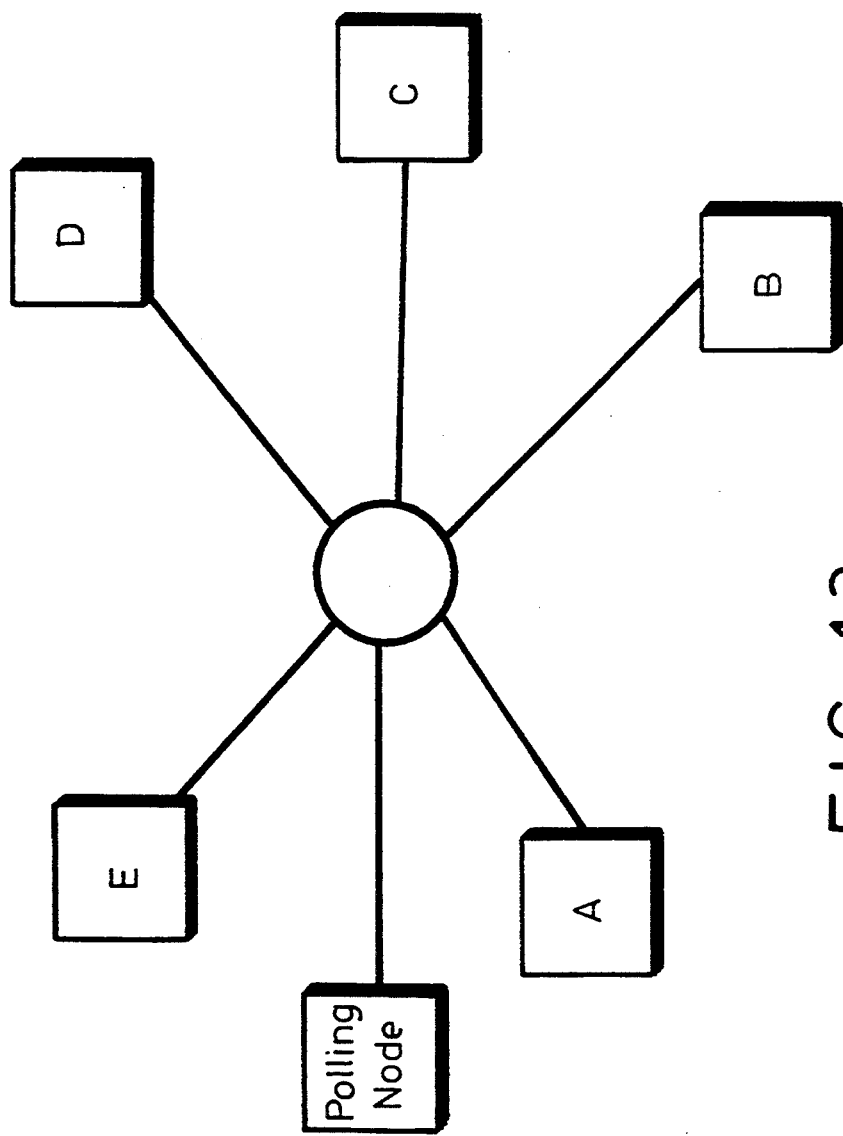
FIG. 12 is a schematic diagram of a star in accordance with a further embodiment of the invention.

A further embodiment of a star or hub bus configuration is shown in FIG. 12. In this embodiment it will De appreciated that the master polling node may be located on any of the star links and the time delays at individual nodes made independent of their physical location on the hub bus. In this case timer values assigned to successive nodes are incremented (from one node to another) by more than twice the maximum propagation delay (tp) on the longest star link of the hub bus. In the description above with reference to FIG. 6 it was stated that for correct operation the following timer delays were satisfactory:

Node A: td; Node B: 2td+2ta; Node C: 3td+2ta+2tb.

Because tp>ta, tb and tc the following time delays give physically independent location of the nodes.

Node A: td; Node B: 2td +2tp; Node C: 3td+4tp; Node D: 4td+6tp.

From the above description the operation of the timed deterministic bus access method is provided for a variety of bus structures namely; linear, tree, hub (or star) and uni-directional for the master polling node located at one end or otherwise (except in the case of uni-directional bases).

In all arrangements it will be understood that compared to existing methods of bus access such as token passing the method provides rapid access to a bus for a waiting packet and thus minimises access time delays. This feature is of particular importance for short packet lengths which occur with high data rates (e.g. on fibre optic buses) or with short packets used to convey real-time (RT) information. It will be understood that the above arrangement are used with heterogeneous nodes.

An important embodiment of the invention therefore relates to a network designed to carry different priority levels of traffic such as real-time (RT) and non real-time (NRT) traffic. It will be understood that in this embodiment the NRT nodes can employ standard Ethernet protocols.

Figure 13:
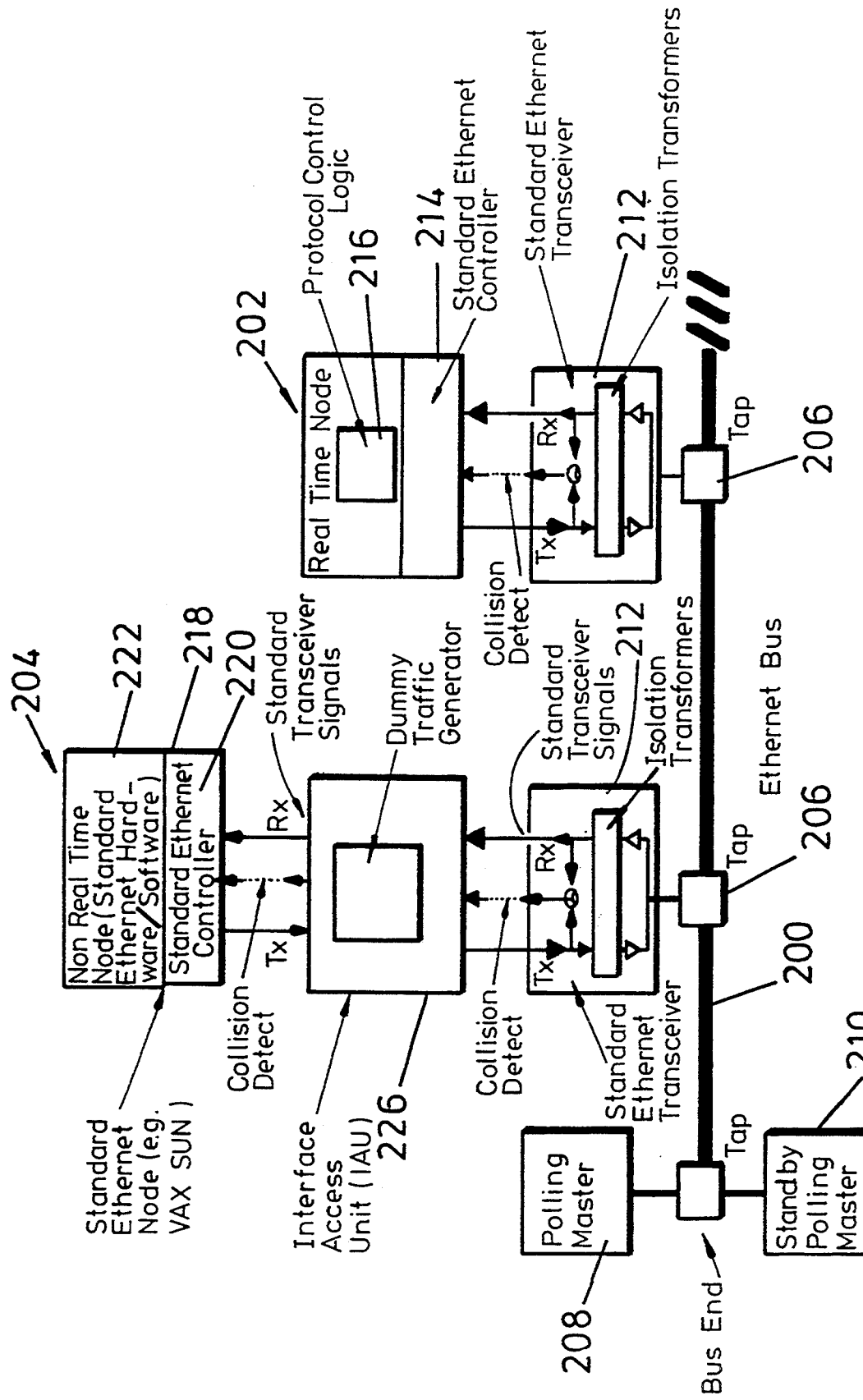
FIG. 13 is a schematic diagram of an Ethernet bus coupled to a Real-time (RT) node and a Non-Real-time (NRT) node in accordance with another embodiment of the invention.

Reference is now made to FIG. 13 of the drawings which depicts an Ethernet bus 200 coupled to a Real-Time (RT) node 202 and a Non Real Time (NRT) node 204 via TAPS 206 on the bus 200. It will be appreciated that a plurality of RT and NRT nodes are coupled to the bus but only two are shown in the interest of clarity. A monitor or polling master node 208 is located at one end of the linear bus 200. Although node 208 may also transmit data only its polling function will be described here. One or more standby polling master nodes 210 are also located at the end of the bus 200 so that if master polling node 208 fails the standby node 210 can assume the polling functions. (Alternatively node time delays can be assigned so that physical location of the nodes including the polling node is unimportant).

Each RT node 202 is coupled to a TAP unit 206 via a standard Ethernet transceiver 212. The RT node 202 includes a standard Ethernet controller 214 and control logic 216 for implementing the method of deterministic access. The NRT node 204 includes a standard Ethernet node 218, for example, a standard computer, such as a Digital Equipment Corporation VAX (trademark) which includes a standard Ethernet controller 220 and standard Ethernet hardware and software unit 222. The node 204 is coupled via an interface access unit (IAU) 226, located in the drop cable (or at an equivalent circuit point with Cheapnet) as disclosed in UK Patent No. 2187917B, and transceiver 212 to TAP 206.

Figure 14:
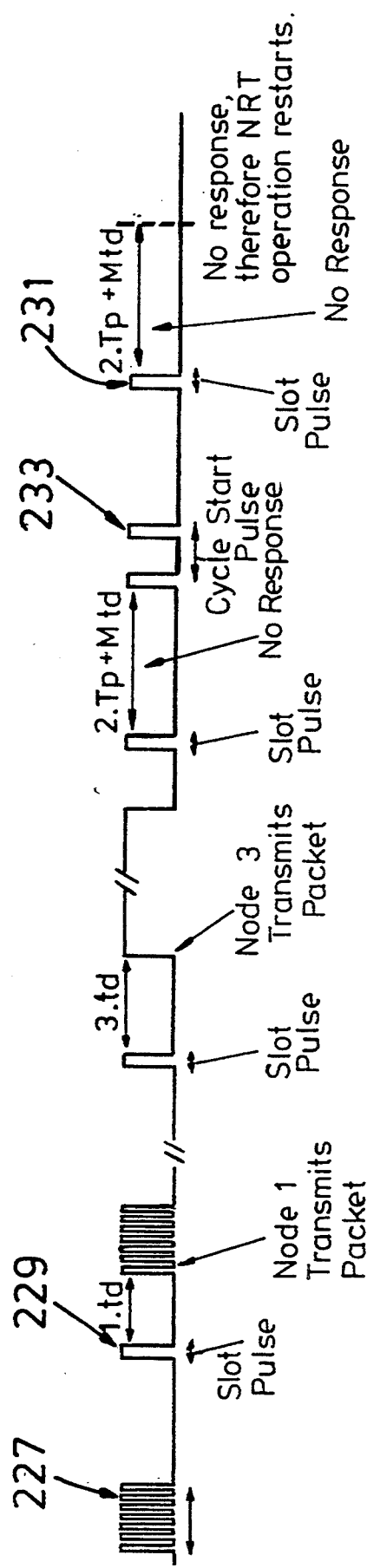
FIG. 14 depicts cycle timing waveforms used with the bus of FIG. 13.

Operation of the timed access method in this arrangement is best described with reference to FIG. 14 as follows:

When the network is in NRT mode, if an RT node becomes active it injects a special signal pattern onto the Ethernet bus once it detects silence on the bus after the end of a packet. Conveniently the special signal pattern can be on collision signal 227 extended beyond its maximum time limit (e.g. to 100 uS.). However any other signal pattern (which can be recognised as non standard by the IAUs) can also be used. The IAUs (226) thus detect the presence of the non standard signal pattern and conveniently generates a carrier signal and transmit a short jam signal to their connected nodes 204 but alternatively can use other signalling methods to prevent transmission from the NRT nodes (204) connected to them the network effectively enters a real-time mode and the polling master 208 issues a slot pulse 229 along the bus as disclosed above. Operation of the basic timed access method for the RT nodes 202 is as previously described above for the bidirectional linear bus tree structure or hub structure with the exception that when no response is received from the slot pulse 231 immediately following a cycle start pulse 233 the network returns to NRT mode. This is best seen in the cycle timing diagram in FIG. 14.

Alternatively it will be appreciated that if the IAUs are so configured, receipt of a slot pulse, preceded by two slot pulses each followed by a pre-determined period of silence can return the network to NRT mode. RT nodes which wish to gain access are then required to issue a non standard signal pattern as before.

It will be appreciated that timed access protocol can be modified to include prioritised access by nodes and this is described in detail below with reference to FIG. 15 which is a schematic block diagram of a linear bus coupled to a polling system in accordance with a further embodiment of the invention to provide prioritised determinsitic access to the bus, and FIGS. 16a and 16b which are waveform diagrams depicting propagation of a slot pulse with an accompanying priority reservation period during which the priority reservation field can be set.

Figure 15:
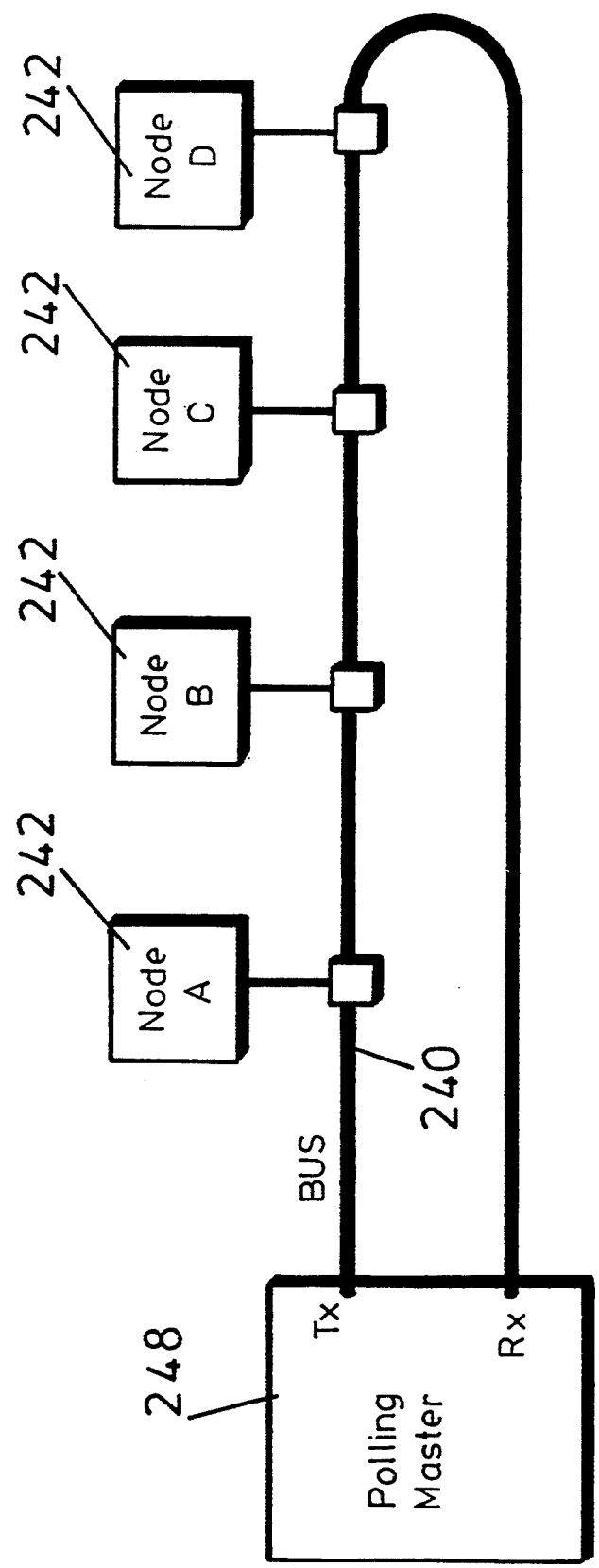
FIG. 15 is a schematic block diagram of a linear bus coupled to a polling system in accordance with a further embodiment of the invention to provide prioritised access to the bus.

Reference is first made to FIG. 15 of the drawings which depicts a bus 240 coupled to four nodes 242A to 242D. It will be appreciated that a plurality of nodes can be coupled but only the four nodes are shown in the interest of clarity. The transmitted output of the master or polling node 248 is located at one end of the bus 240 and the receiving circuits are located at the other end of the bus. The primary purpose of the master node, is to control access to the bus rather than transmit data.. Standby master nodes (not shown) can be provided as described above.

Operation of the system will now be described with reference to FIGS. 15 and 16a . All nodes 242 coupled listen to the bus. The master polling node 248 monitors the bus and issues a timing reference signal which we shall conveniently represent diagramatically as being of "slot" pulse 250 rectangular shape as seen in FIG. 16a, (for a network data transmission rate of 1 to 10 Mbps) when the bus is silent. As will be seen from FIG. 16a a priority reservation field 252 contained within priority reservation period 253 is included after the slot pulse 250 and before the Node Packet Start period (NPS) 254.

As the slot pulse 250 propagates down the bus, the nodes 242 compare their priority with the present state of the priority reservation field and if their priority is higher set their priority by transmitting 3 priority reservation bits 252 onto the bus 240 to allow eight distinct levels of priority. It will be appreciated that the bus 240 may already be transmitting a packet from a lower priority upstream node. The slot pulse 250 is followed by the priority reservation field which after passing node D contains the priority of the highest priority node wishing access to the bus 240, propagates back to the receiving circuits Rx on the master polling node 248. The master polling node 248 then issues the next slot pulse with the priority field 252 set to the highest priority encountered on the previous slot pulse cycle. As the slot pulse travels along the bus each node compares the state of the priority reservation field with its own priority and if it has an equal or higher priority and the bus is silent at the time it wishes to start packet transmission then it can do so. Various algorithms can be employed to reduce the value of the priority reservation field when their is no response to a slot pulse at a particular priority level. In the first algorithm the priority level on release of the next slot pulse is reduced by one. In the second it is divided by two (ie right shifted one place). In the third it is set to zero.

It will be appreciated that in the foregoing method higher priority downstream nodes cannot get access in a particular slot pulse cycle because an upstream node of lower priority has sent its packet using the timed access method. In certain applications this may cause unacceptable waiting time delays.

Figure 16:
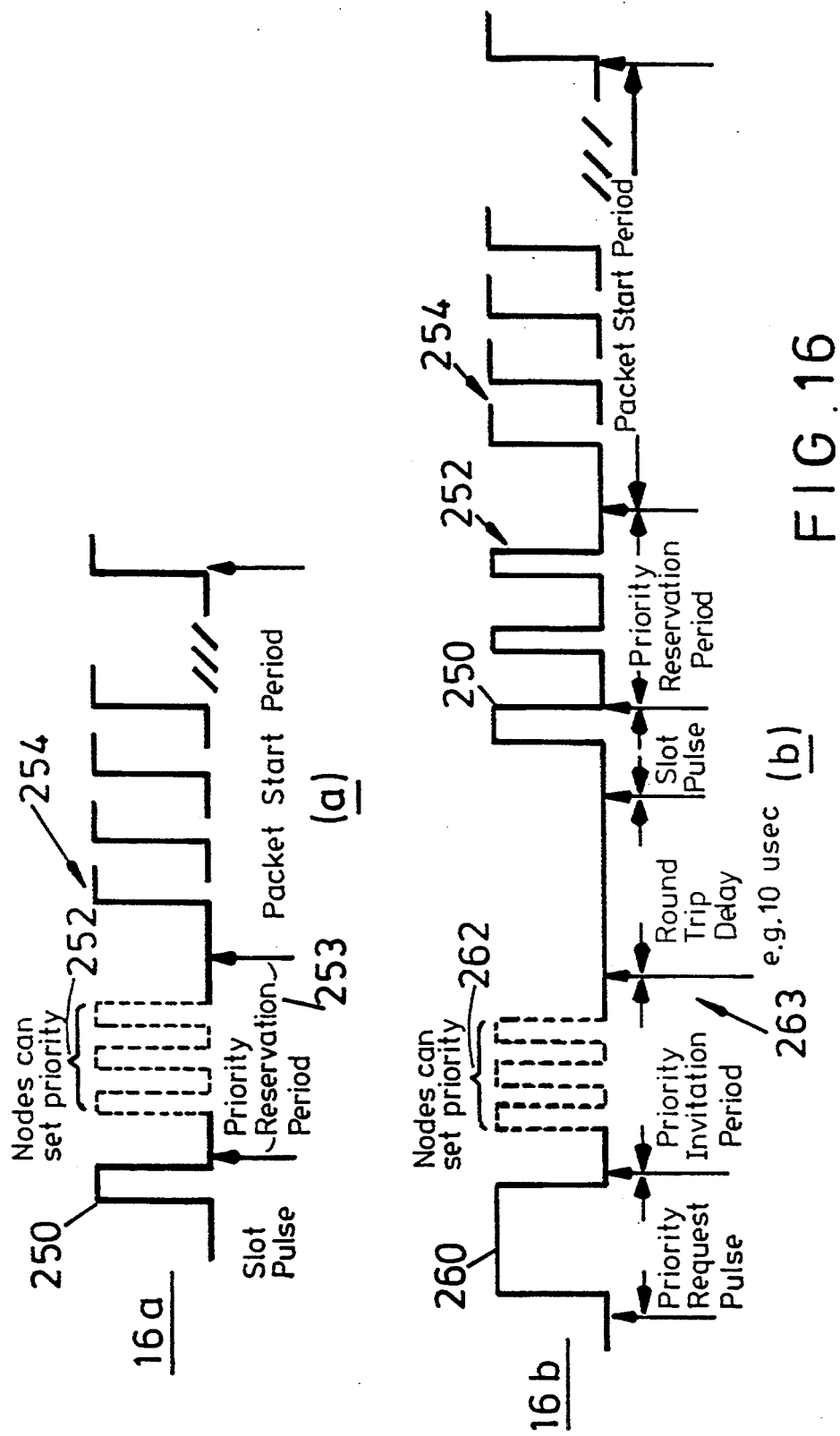
FIGS. 16a, 16b are waveform diagrams depicting propagation of a slot pulse with an accompanying priority reservation period which accommodates a priority reservation field for use with the bus shown in FIG. 15.

Reference is now made to FIG. 16b which depicts an arrangement to avoid these waiting time delays by introducing a priority request pulse 260.

During the priority invitation period 263 following the priority request pulse 260 nodes 242A to 242D set their priority fields 262 which circulate back to the master polling station 248. This station then issues a normal slot pulse 250 which allows the first upstream node with priority equal or greater than the priority reservation field 252 to transmit a packet 254 during the current slot pulse cycle.

Various modifications may be made to the embodiments hereinbefore described without departing from the scope of the invention. For example, the foregoing descriptions conveniently depicts the slot pulse, and the priority request and reservation pulses as a single rectangular pulse and the cycle start pulse as a pattern of two adjacent rectangular pulses. It will be appreciated that this is merely a diagrammatic representation to indicate a means of providing unique time references to the receiving stations. Thus any other signal pattern suitable for transmission over a bidirectional or unidirectional bus and which, when received, can provide a unique time reference or priority indication is included within the scope of the invention. For instance it will be appreciated that a sequence of bits (possibly preceded by a preamble) suitably encoded for transmission over a bus (e.g. by Manchester encoding) can be used. In the case of an Ethernet type bus this sequence of bits may consist of a whole or a part of a standard (or non-standard) Ethernet packet and may conform or not to the standard Ethernet signal levels and timings and in decoding the sequence of bits the receivers may group the received sequence of bits into bytes (or other suitable groupings). Thus one sequence of bits, which can be uniquely interpreted by the receiving nodes, may be used as the slot pulse and another unique pattern may be used as the cycle start pulse and as priority request (invitation) or set pulses(s).

It will be further appreciated that at the time of initial network configuration (set-up) the value of the timers in the various nodes can be set manually on the basis of the order of the node from the polling node or automatically. In an example of automatic setting the polling node sends a unique "timer set" signal pattern to each of the receiving nodes in turn possibly using another medium access protocol to establish connections such as CSMA/CD. The unique pattern contains address information so that it can be addressed to an individual node. The recipient node replies after a fixed time interval. The polling node notes the delays involved between the transmission of the "timer set" pattern and receipt of the reply and stores value in the memory of the polling master station. This value is a unique measure of the distance of the particular node from the polling master station. After suitable processing the master polling node then allocates a unique value of timer delay to each node using the network's communication facilities.

Where two or more stations respond at nearly the same time, the station addresses are used to assign unique times values. It will be appreciated that when the time increments between the successive timer deity (ntd and (n+1) td) assigned to successive nodes exceed the time measuring uncertainty by a suitable margin then the method gives satisfactory values of time delay at each node.

It will further be appreciated that to cater for the requirements of higher reliability systems a number of nodes can be equipped with polling facilities so that on failure of upstream nodes the most upstream operational node, automatically assumes the polling function.

With uni-directional buses which can support several packets within the end-to-end propagation time of the bus, each, node is equipped with the capability of issuing slot pulses after it has transmitted the end of its packet. In this arrangement the master polling node passes received slot pulses back to its upstream output. This arrangement allows several packet to co-exist on the bus and gives advantages analogous to multiple token operation.

It will be understood that the polling master contains facilities which provide for recovery from lost slot and/or cycle start pulses. Also more than eight levels of priority can be provided depending on requirements of the system by increasing the number of priority reservation bits.

Advantages of the invention are; there is provided a method of providing deterministic prioritised access to a bus which can have connected to it a plurality of nodes with different priorities and which is relatively inexpensive and straightforward to implement. It provides deterministic timed access without the need to maintain a logical ring (map) in all nodes and allows nodes to leave and rejoin the network without the need for software reconfiguration. The method provides simplified access to all nodes and offers substantially reduced access time per node when compared with existing methods particularly when priorised features are employed. The improved bus access method of this invention offers considerable advantages in performance over the widely used shared bus access methods such as CSMA/CD, central polling and token passing.

We claim:

1. A method of providing deterministic access to a bus structure having a plurality of nodes coupled thereto, in a data communications network, each node being capable of transmitting and receiving data packets to and from said bus structure respectively, and each node having a physical node address, which is defined as the address for said data packets, said method providing round robin scheduling of all nodes waiting to transmit data packets, and said method comprising the steps of,
    a) disposing a polling node, capable of generating a polling signal, defined as a timing reference signal, at a suitable point on the bus structure;
    b) generating said timing reference signal which is independent of any data packets from said polling node to invite transmission of the data packets onto the bus structure after a period of silence;
    c) providing each node coupled to the bus structure with a unique predetermined time delay, defined as the node time delay, said node time delay starting from receipt of said timing reference signal and said time delay being fixed at network configuration time, which is prior to the start of normal transmission of data packets on the network, each said node time delay at a respective node being independent of said physical node address;
    d) detecting said timing reference signal at each said node as said timing reference signal travels along the bus structure, said timing reference signal being used by each of the nodes as the only timing reference signal to control its transmission activity onto the bus structure;
    e) including within each of said nodes two internal flags to control the operation of the node in respect of transmission of data packets, said flags being defined respectively as a Next Slot flag and a Transmit flag, the operation of each said nodes being such that transmission of a data packet onto the bus structure from an active node is permitted if the bus is silent at the expiration of said node time delay, providing that neither said Next Slot flag nor said Transmit flag is set, the method including the further steps of;
        i) setting said Next Shot flag, until the next timing reference signal is received by said node, if either said node does not have a data packet ready to transmit at the time it receives said timing reference signal or, if said node is unable to transmit a data packet when its said node time delay expires, as the bus is busy at that time,
        ii) setting said Transmit flag when said node starts to transmit a data packet;
    f) arranging that the said polling node generates the next said timing reference signal either:
        i) after said polling node has detected that the bus has gone silent after the end of a data packet or
        ii) after said polling node has detected that a sufficient period of silence has elapsed for said polling node to know that no other nodes are going to transmit a data packet in response to the current timing reference signal;
    g) arranging that each of said Transmit flags in each of said nodes is reset when a said sufficient period of silence has elapsed that no other nodes are going to transmit a data packet in response to the current timing reference signal, and
    h) supporting communications for said data packets and said timing reference signals over a single shared bus structure such that data packets follow the timing reference signals in same shared data communications channel.

2. A method as claimed in claim 1 wherein the said polling node is disposed at one end of the bus.

3. A method as claimed in claim 2 wherein when said bus structure is a bidirectional linear bus, and said polling node is at one end of the bus the value of the node time delay at each one of said nodes increases according to the order of the physical location of the node on the bus structure reckoned from the polling node.

4. A method as claimed in claim 2 wherein when the polling node is located at one end of the bus structure, the said node time delay of each node is calculated using the formula $n.t_d$ where n is an integer representative of the node position reckoned from the polling node and $t_d$ is a small time delay which is sufficient to permit the active node nearest the polling node to transmit first.

5. A method as claimed in claim 1 wherein the method includes the step of equipping a number of nodes with polling facilities whereby on failure of the present polling node the operational node closest to the failed polling node automatically assumes the polling function.

6. A system for providing deterministic access to a bus structure having a plurality of nodes coupled thereto, in a data communications network, each node being capable of transmitting and receiving data packets to and from said bus structure respectively and each node having a physical node address which is defined as the address for said data packets, said system providing for round robin scheduling of all nodes waiting to transmit data packets and said system comprising:
    a) polling means coupled to the bus structure at a suitable location for generating a polling signal which is defined as a timing reference signal, which is independent of said data packets on said bus structure, said timing reference signal being used by each of said nodes coupled to the bus structure, as the primary means to initiate transmission of said data packets onto the bus structure after a period of silence, b) each of said nodes coupled to the bus structure having timing reference signal detecting means for detecting said reference signal as it passes said node, c) each of said nodes having means for storing a unique predetermined time delay, the value of which is independent of said node's physical node address, said unique predetermined time delay being defined as the node time delay, and said node time delay being fixed at network configuration time, prior to the start of normal transmission of data packets, d) each of said nodes having bus activity monitoring means for monitoring the transmission activity of the bus structure for timing reference signals and data packets, e) providing communications means over said bus structure for supporting communications for said data packets and said timing reference signals such that said data packets follow the timing reference signals in the same shared data communications channel, f) each of said nodes having transmission control means provided by internal bits within each of said nodes which are used as two flags which control the transmission of data packets onto the bus, said flags being defined as a Next Slot flag and a Transmit flag, the operation of said node being such that said bus activity monitoring means causes a data packet to be transmitted from said node when said bus activity monitoring means detects that the bus is silent at the time said node time delay has expired add neither said Next slot flag nor said Transmit flag is set, The system being arranged to Operate such that:

i) said Next Slot flag is set, until the next timing reference signal is received by said node, if either said node does not have a data packet ready to transmit at the time it receives said timing reference signal or when said node is unable to transmit a data packet when its said node time delay expires because the bus is busy at that time, ii) the said Transmit flag is Set when said node starts to transmit a data packet, iii) the next said timing reference signal is generated after said polling node has detected that one of two next timing reference signal conditions has arisen, firstly that the bus has gone silent after end of a data packet or, secondly after said polling node has detected that a sufficient period of silence has elapsed for said polling node to know that no other nodes are going to transmit a data packet in response to the previous timing reference signal, iv) arranging that when next said timing reference signal is generated as a result of the said second timing reference signal condition each of said Transmit flags in each of said nodes is reset.

7. A system as claimed in claim 6 wherein when said bus structure is a bidirectional linear bus and the polling means is located at one end of the bus structure the value of the node time delay at each one of said nodes increases according to the order of the physical location of the node on the bus structure reckoned from the polling node—so that a node further from the polling node always has a node time delay greater than its immediate neighbor closer to the polling node whereby the active node closest to the polling node transmits first.

8. A system as claimed in claim 6 wherein the bus structure is selected from the group consisting of a bidirectional linear bus, a star (hub) and a tree.

* * * * *